US008884749B1

(12) United States Patent
Palmer

(10) Patent No.: US 8,884,749 B1
(45) Date of Patent: Nov. 11, 2014

(54) DRIVER INFORMATION AND ALERTING SYSTEM

(71) Applicant: Brian Palmer, Orem, UT (US)

(72) Inventor: Brian Palmer, Orem, UT (US)

( * ) Notice: Subject to any disclaimer, the term of this patent is extended or adjusted under 35 U.S.C. 154(b) by 121 days.

(21) Appl. No.: 13/658,464

(22) Filed: Oct. 23, 2012

(51) Int. Cl.
B60Q 1/00 (2006.01)

(52) U.S. Cl.
USPC ............... 340/438; 340/439; 701/29; 701/36; 701/49

(58) Field of Classification Search
USPC ................. 340/438, 439, 449, 453, 459, 462; 701/29, 30, 31, 32, 35, 36, 49, 301
See application file for complete search history.

(56) References Cited

U.S. PATENT DOCUMENTS

| 5,796,401 | A | 8/1998 | Winer |
| 6,795,760 | B2 | 9/2004 | Fuller |
| 6,807,469 | B2 * | 10/2004 | Funkhouser et al. ......... 701/31.8 |
| 7,116,216 | B2 | 10/2006 | Andreasen |
| 7,786,851 | B2 * | 8/2010 | Drew et al. .................... 340/438 |
| 7,853,375 | B2 | 12/2010 | Tuff |
| 7,920,102 | B2 | 4/2011 | Breed |
| 7,928,837 | B2 | 4/2011 | Drew |
| 8,180,522 | B2 | 5/2012 | Tuff |
| 2003/0058280 | A1 | 3/2003 | Molinari |
| 2005/0177288 | A1 * | 8/2005 | Sullivan et al. ................. 701/36 |
| 2006/0277498 | A1 | 12/2006 | Mann |
| 2006/0277499 | A1 | 12/2006 | Britt |
| 2008/0033609 | A1 * | 2/2008 | Razavi ............................. 701/33 |
| 2008/0126352 | A1 | 5/2008 | Case |
| 2008/0137860 | A1 | 6/2008 | Silvernail |
| 2008/0140281 | A1 | 6/2008 | Morris |
| 2008/0147268 | A1 | 6/2008 | Fuller |
| 2009/0184812 | A1 | 7/2009 | Drew |
| 2010/0023198 | A1 * | 1/2010 | Hamilton ........................ 701/29 |
| 2011/0258044 | A1 | 10/2011 | Kargupta |
| 2011/0313593 | A1 | 12/2011 | Cohen |
| 2012/0106342 | A1 | 5/2012 | Sundararajan |

FOREIGN PATENT DOCUMENTS

EP 1513288 9/2005

OTHER PUBLICATIONS

Palmer, Brian, Image of web page for PCMScan software product, abt. 2005.
Palmer, Brian, User Manual for PCMScan Software, abt. 2005.
CAN Tool Guide for 2008+ BMW 135/335/535/X5 (BMW_CAN_tool.pdf).

(Continued)

Primary Examiner — Hung T. Nguyen
(74) Attorney, Agent, or Firm — ColterJennings

(57) ABSTRACT

A system of reporting vehicle telemetry to a vehicle operator or other user includes a device that removably attaches to the vehicle data port to monitor vehicle operating conditions and communicate with vehicle control modules. A user may configure the device without making permanent changes to the vehicle. The device understands and interprets vehicle communications protocols and can send diagnostic commands to the control modules to allow user-customized text or data to be shown or indicated using built-in or factory installed vehicle displays, lights, or sounds. The system permits showing of multiple user-configured pages of vehicle data or other information and provides real-time updates and configurable switchable profile and display settings. The device monitors factory installed vehicle buttons, switches, knobs, and sensors, and allows use of those items to perform customization and configuration tasks without the need for peripheral input accessories connected to the device. The device permits the user to configure vehicle operating parameter limits, make custom calculations, generate new information, and provide user-desired information to the vehicle operator or other user.

19 Claims, 5 Drawing Sheets

(56) References Cited

OTHER PUBLICATIONS

ISO 15765-4 Jan. 2005 (ISO_15765-4_2005.pdf).
ISO 9141 AN602 by John Bendel Apr. 1996 (iso9141_an602.pdf).
ISO 9141-2 Feb. 1994 (ISO9141-2_1994.pdf).
ISO/DIS 13400-1 Sep. 2010/Feb. 2011 (ISO_DIS_13400-1.pdf).
ISO/DIS 13400-2 Sep. 2010/Feb. 2011 (ISO_DIS_13400-2.pdf).
ISO/DIS 13400-3 Sep. 2010/Feb. 2011 (ISO_DIS_13400-3.pdf).
Juice Box Stage 4 PnP—135/335/535 Installation Guide—Jun. 20, 2012 (JB4PnP.pdf).
KWP 2000/14230-1 Oct. 1997 (14230-1s.pdf).
KWP 2000/14230-2 Apr. 1997 (14230-2s.pdf).
KWP 2000/14230-3 Feb. 2000 (14230-3s.pdf).
SAE J1850 Jun. 2006 (saej1850v004.pdf).
SAE J1962 Apr. 2002 (saej1962v003.pdf).
SAE J1978 Apr. 2002 (saej1978v003.pdf).
SAE J1979 May 2007 (saej1979v003.pdf).
SAE J2178-1 Jul. 2004 (saej2178-1v003.pdf).
SAE J2178-2 Jul. 2004 (saej2178-2v003.pdf).
SAE J2178-3 Jul. 2004 (saej2178-3v004.pdf).
SAE J2178-4 Jul. 2004 (saej2178-4v003.pdf).
SAE J2190 Jun. 1993 (saej2190v001.pdf).
SAE J2534-1 Dec. 2004 (saej2534-1v002.pdf).
SAE J2534-2 Mar. 2006 (saej2534-2v001.pdf).

* cited by examiner

DRIVER INFORMATION AND ALERTING SYSTEM

BACKGROUND

This application relates generally to a method and system for providing vehicle drivers and operators with information and alerts regarding vehicle operating parameters, and in particular when those parameters exceed user-configured limits.

Since at least 1996, every light duty passenger vehicle sold in the United States has had a computer diagnostic data connection port, such as an OBD1, OBD2, or SAE-J1962 port. This data port permits a mechanic or other user to connect to the vehicle and retrieve vehicle diagnostic data, that is, data about the vehicle, including engine, fuel system, brake system, door locks, climate control systems, and other data. Scan tools have been developed to permit mechanics and repair technicians to connect to the vehicle and monitor sensor data in real time as well as read and clear trouble codes and reset engine operating data and learned values.

Modern vehicles today often come equipped with one or more displays built-in to the vehicle. For example, a vehicle may feature a heads-up display (HUD), a navigation display, a radio display, an instrument cluster display (such as a display showing trip information or odometer readings) or other types of displays.

Most of these built-in displays are not intended (or even designed) to allow the driver to customize what information is displayed. For instance, a typical radio display may show the currently selected radio station, or even the currently playing song name, but was not designed to permit the driver to customize the radio display to, for example, show engine speed and coolant temperature instead of the song name. Thus, the use of the display is fairly limited.

Some vehicle displays do come with limited modification options. For example, the driver may be able to use a button on the steering wheel to change an instrument cluster display between multiple preset values such as odometer, trip A, trip B, distance to empty, or other values. However, if the driver desires to see some vehicle data value not offered by the display, he is unable to customize the built-in display to show that data value.

Modern vehicles today usually come equipped with one or more audible chime systems and warning lights. For example, if the vehicle detects that the driver seat belt is not buckled, the vehicle may illuminate a warning light and sound the audible seat belt chime to warn the driver to buckle up. In other situations, if the vehicle begins moving and one or more vehicle doors are ajar, the vehicle may illuminate a door ajar warning light and sound a door ajar chime to warn the driver. Some vehicles also include a backup camera or parking system that beeps or chimes to indicate that the vehicle is approaching or nearing another vehicle or obstruction.

With the reliability of modern vehicles, many of the visual warning lights on the instrument cluster may never actually illuminate to indicate a vehicle fault within the lifespan of the vehicle. For instance, an airbag deployed warning light may only illuminate for the first time after the vehicle has already crashed and may no longer be drivable. If the vehicle is never involved in a crash, the light may never illuminate.

Other visual warning lights may have obscure or even not very useful meanings such as a skip shift warning light. Other visual warning lights may even be redundant in nature such as having a fuel level gauge as well as a low fuel light. Some visual warning lights may come configured from the factory to illuminate when specific preset limits have been exceeded, such as a tire pressure warning light always illuminating if the tire pressure drops below 26 psi. If the driver is utilizing special tires, such as racing tires that may require less than 26 psi for proper inflation or even much more than 26 psi for proper inflation, the built-in tire pressure warning light may be useless because the factory preset limits would no longer apply to the current tires in use.

Previously, vehicle operators or other users wanting additional vehicle information other than that available from built-in or factory installed vehicle displays and warning lights often installed aftermarket gauge pods into the vehicle. Frequently this required cutting holes in the dashboard to accommodate the newly installed gauges. Other solutions included bolting on additional panels to hold the gauges, such as by adding a new A-pillar gauge panel. These solutions typically require permanent modification to the vehicle, which can reduce resell value and deter would-be buyers, and may significantly reduce the often-desirable "factory look" of the vehicle.

Other prior solutions to obtain additional vehicle operating data or alerts included adding an extra display, such as an LCD display, connected to the vehicle diagnostic port. These displays are usually quite large (several inches across) and mounted on the dashboard or suctioned to the windshield. Unfortunately, these solutions often require permanent modification to the vehicle for installation and may even reduce the driver's field of vision due to a large display being suctioned to the windshield.

Some prior products allowed the user to reflash or reprogram a vehicle display with a different calibration that contains altered display parameters. Doing this may void the factory warranty, and may require the user to perform an additional reflash each time the user wants to further alter the display parameters. Thus, although modern vehicles may come equipped with many different displays and audible and visual warning systems, the driver is typically unable to customize those displays based on the driver's preferences, or to cause those displays to present information beyond the manufacturer's built-in limits. Thus, having an aftermarket device that simply attaches to the vehicle diagnostic port, and may be unplugged when not wanted, which provides enhanced information, customization, and alerting, without permanent modification of the vehicle, would be useful.

SUMMARY

The present system includes a device removably attached to the vehicle data port that monitors vehicle operating conditions and communicates with the engine control module or other electronic control modules within the vehicle. The system requires no permanent installation or changes to the vehicle and permits the user to unplug and remove the device from the vehicle when no longer needed or wanted. The device understands vehicle communications protocols and while monitoring vehicle operating parameters and conditions and communicating with the vehicle electronic control modules, the device can send diagnostic commands to the control modules to instruct them in various ways, for example, to show user-customized text or data, or to illuminate vehicle warning lights or to sound vehicle chime systems to alert the vehicle operator.

The device is designed to be used while the vehicle is moving and constantly monitors the vehicle conditions, sensors, data, and other operating parameters and to provide real-time updates to vehicle displays, warning lights, and audible chime systems via communications through the vehicle diagnostic data port. The device may include wireless and wired (such as USB) connections to allow the vehicle operator or other user to perform configuration of the device to customize features, settings, and options. The device may also include a built-in switch to allow the vehicle operator or other user to customize the device or to switch profile settings while the vehicle is in motion by simply moving the switch to the desired position. The device may also include a user configuration menu system that allows the vehicle operator or other user to perform customization and configuration tasks while driving.

The device is capable of monitoring existing factory installed vehicle buttons, switches, knobs, and sensors, and also allows the user to use one of these items (that is, the buttons, switches, knobs, sensors) to enter the user configuration menu system and perform customization and configuration tasks. As one example, the device could monitor cruise control buttons and, when cruise control is not active, repurpose some of the cruise control buttons to assist in user configuration.

Using the factory installed vehicle buttons allows the device to provide for user configuration without the need for an additional touch input display, keyboard, or other peripheral input accessory connected to the device. If more advanced sensors become available as factory installed items in vehicles, it will be possible for the device to monitor for spoken or physical "gestures" that can be used for user configuration. For example, if a vehicle comes factory equipped with a microphone or visual sensor, the device could monitor this sensor for a specific spoken gesture or physical gesture, such as a hand wave, and in response take some user configuration action.

The device permits the user to configure vehicle operating parameter limits. The device then monitors vehicle operating parameters and when a configured limit is exceeded the device may show custom text on one or more vehicle displays or sound a built-in vehicle chime or even illuminate one or more visual warning lights in response. The device may also include peripheral input ports to acquire other data that can then be shown on built-in vehicle displays or used as a condition that, when met, would illuminate a vehicle warning light.

The device also includes a feature that permits the user to generate new data based on existing vehicle or peripheral input data. That is, the user may configure the device to take data from the OBD-II port and, using custom calculations, formulas or algorithms, generate new information. For example, the user could configure the device to calculate horsepower based on a change in vehicle speed, factoring in the known vehicle mass. These generated parameters could then be shown on one or more of the various vehicle displays or used as a condition to illuminate a warning light or sound an audible alert.

BRIEF DESCRIPTION OF THE DRAWINGS

Other features and advantages of the present invention will be apparent from the following Detailed Description taken in conjunction with the accompanying Drawings, in which.

DETAILED DESCRIPTION

Modern vehicles typically have a data port, such as an On-Board Diagnostics II port ("OBD-II port"). These ports are used to communicate with the on-board electronics and diagnostics systems of the vehicle, typically using a computer or specialized ODB-II diagnostic appliance. According to the present disclosure, a system is provided that permits a user to communicate with the OBD-II port (or other similar port) and not only read the vehicle data available on the port, but also to customize the configuration of the various factory-installed displays and output devices to communicate various vehicle data to the driver (or other occupants of the vehicle) based on what the driver or user of the device wants.

Figure 1:
FIG. 1 depicts a perspective view of an exemplary interior of a vehicle having a data port in which the present system may be deployed.
Figure 2:
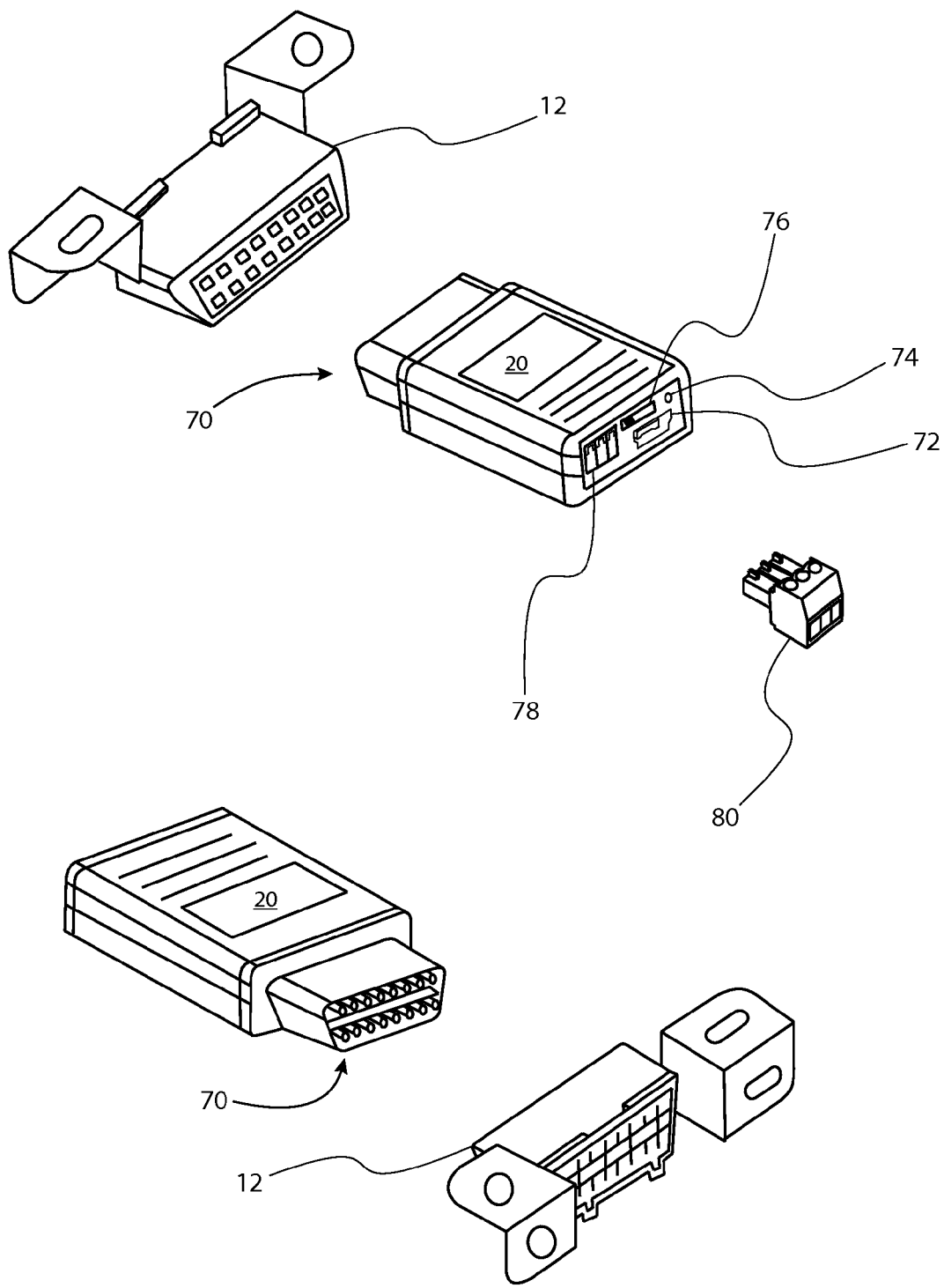
FIG. 2 depicts a vehicle diagnostic data port and a device that attaches to the vehicle diagnostic data port and has an analog input port and corresponding input connector, USB port, user configuration switch, and status LEDs.

As depicted in the FIGURES, a vehicle 10 includes at least one vehicle data port 12, which is typically an OBD-II port but may be other data ports. In the embodiment depicted in FIG. 1, a device 20 connects to the data port 12 through a cable 16. As depicted in FIG. 2, according to another embodiment the device 20 plugs directly into the port 12, without using a communications cable 16.

Modern vehicles often come equipped with numerous features that employ a variety of visual displays as well as a sophisticated audio system. Vehicles also come equipped with various switches, buttons, knobs, sensors, or other controls that operate one or more of those displays or vehicle systems. For example, as depicted in FIG. 3, a vehicle may incorporate a range of gauges, lights and displays, such as a speedometer 22, a multi-function instrument cluster display 24 (which often shows such things as odometer data, trip odometer data, outside temperature data, and vehicle service data), a tachometer 26, a fuel gauge 28, a temperature gauge 30, an oil pressure gauge 32, a battery gauge 34, and various warning indicator lights 38.

Figure 3:
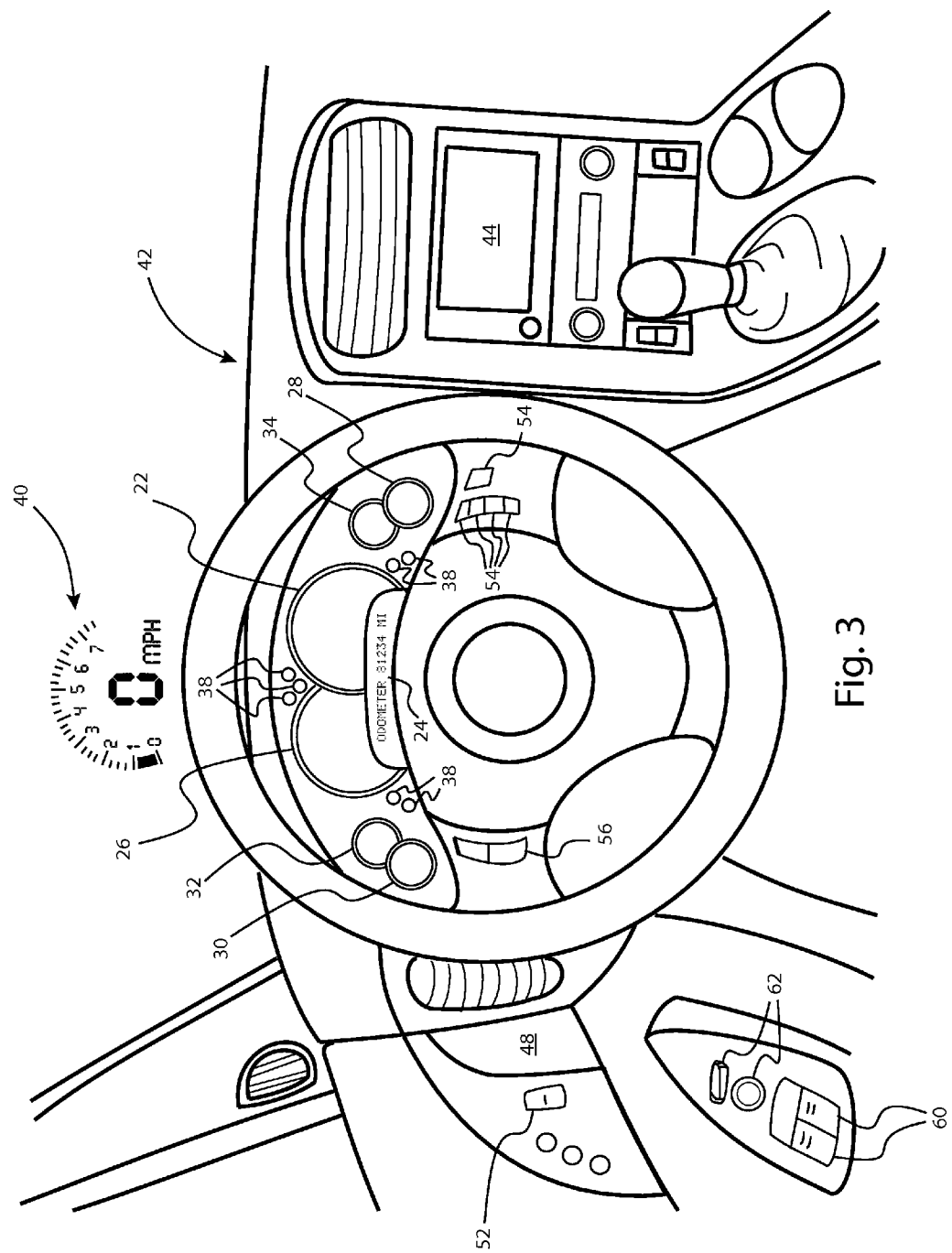
FIG. 3 depicts an exemplary vehicle dashboard incorporating a heads-up display, navigation radio display and an instrument cluster having a display, gauges, and visual warning lights, with the displays showing information as preset at the factory.
Figure 4:
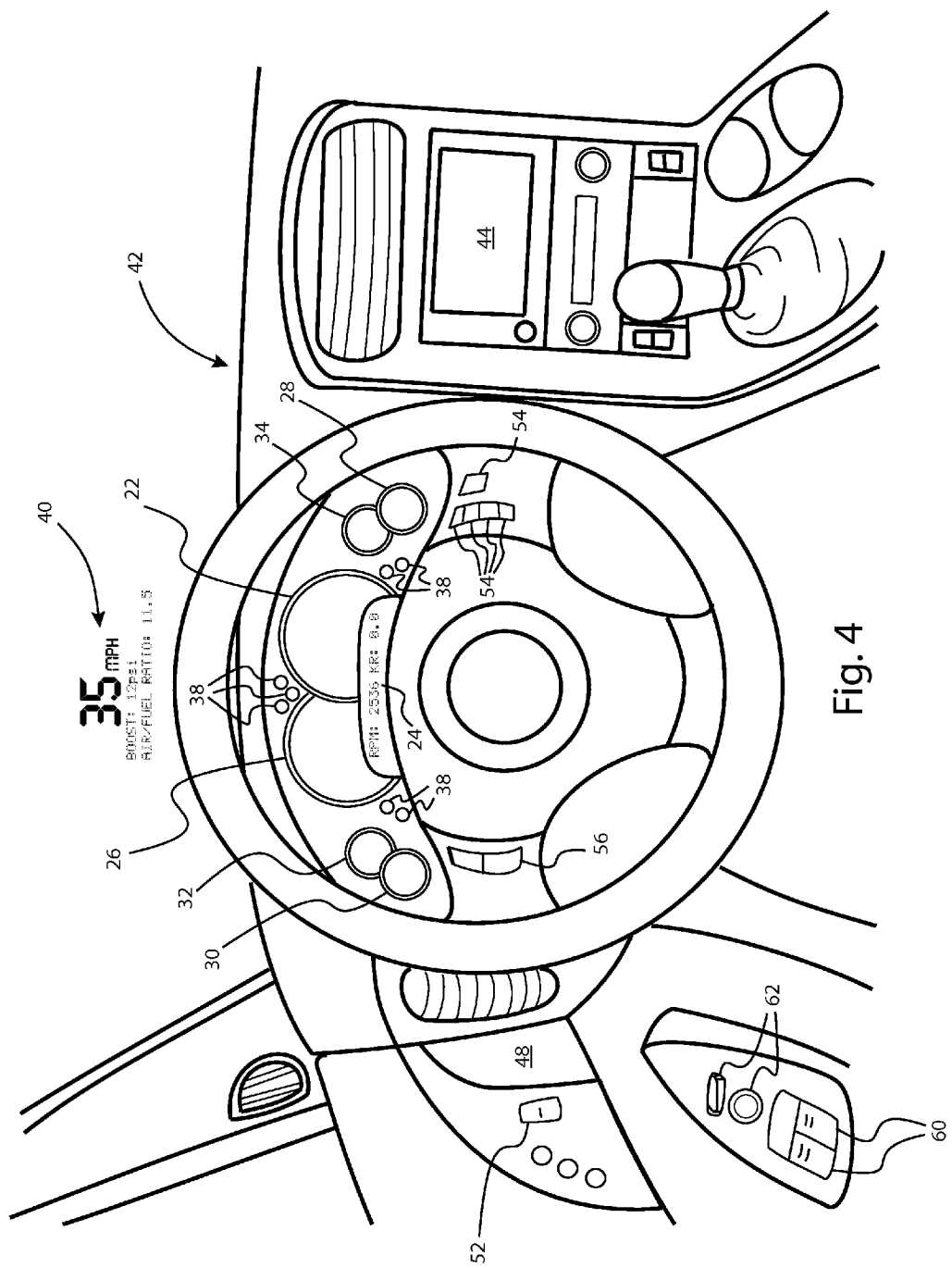
FIG. 4 depicts the dashboard of FIG. 3 with certain of the displays showing customized information as configured by the vehicle operator or other user.

The vehicle shown in FIG. 3 also has a heads-up display 40. A typical heads-up display 40 projects vehicle information up from the dashboard 42, off the vehicle windshield and into the driver's eyes (when the driver looks slightly down from the road). The heads-up display 40 often is configured at the factory to display a small sub-set of the data shown in the other gauges, such as vehicle speed (from the speedometer 22) and engine RPM (from the tachometer 26).

FIG. 3 also depicts a navigation radio display 44 (which is a combined radio and GPS) in the middle of the dashboard 42. Typically, the vehicle includes a sound system and speakers 48. The vehicle may also include such buttons, knobs, and switches as a door lock/unlock button or rocker switch 52, a plurality of radio control buttons and switches 54 mounted on the steering wheel, cruise control buttons and switches 56, power window switches 60, a set of mirror control knobs, switches and buttons 62, and a wide variety of other driver controls for the various systems in the vehicle (including the horn, the air conditioning and heating units, and other known vehicle systems).

Each of these gauges, warning lights and other displays are configured at the factory to show different vehicle data, such as vehicle speed, engine RPM, vehicle odometer, radio station, mapping information, telephone calling information, and various other types of information and data. The various knobs, buttons and switches in the vehicle come pre-configured (from the factory) to control the various vehicle systems, such as the windows, cruise control, radio, door locks, interior lighting, air conditioning and heating, and other vehicle systems. The device 20 communicates through the OBD-II port 12 with the various vehicle systems to read information and other sensor data from the vehicle and to command vehicle displays, audible chime systems, visual warning lights, and other vehicle systems to operate as desired and as configured by the user.

As depicted in FIG. 2, the device 20 typically includes various communications ports. For example, the device 20 has an OBD-II (or other port) connector 70 that plugs into the OBD-II port 12. The device 20 may also include a USB port 72 that would permit (among other things) the device 20 to be connected to a computer, laptop, tablet or phone to permit the user to configure the device 20. The device 20 may also include indicator lights such as LEDs 74, a configurable switch 76, and a peripheral or analog input port 78. FIG. 2 also depicts a terminal block 80 that plugs into the port 78 on the device 20; the terminal block 80 accepts sensor voltage and ground wires for reading analog sensor voltages.

The present system permits a user to create a series of customized pages of vehicle data that may then be shown on one or more of the vehicle displays (such as the heads-up display 40, the navigation radio display 44, or the instrument cluster display 24). The device 20 monitors information on the OBD-II port 12 and the peripheral input port 78. The device 20 uses the data obtained from those ports in various ways, such as showing such data (as selected by the user) on one (or more) of the displays, as well as using that data to calculate other data and then showing that calculated data on the displays. In each case, the data is shown on the displays as a part of one or more user-configured pages of data.

The system permits a user to create a series of customized pages of data. Each page may contain different data, which data may come directly from the OBD-II port 12 (or peripheral input port 78) to be displayed on a given page, or the data may be calculated or derived from other data obtained from one (or both) of the ports. That is, the user may configure the device 20 to take data from the OBD-II port and, using custom calculations, formulas or algorithms, generate new information. The new information may then be included on a page, and the page shown on one of the vehicle displays. Each of the displays can be used to display different pages, and a series of pages may be created and shown on each display, with the user able to select a different page to be shown on the display using one or more of the vehicle switches or buttons.

According to the present system the device 20 makes use of the displays and warning lights built into the vehicle 10 to provide information to the operator (or other occupant or user) of the vehicle 10. The device 20 can show several "pages" of data or other information using the same display. For example, in present vehicles, the heads-up display has a somewhat limited size. Thus, the device can cause that display to present to the driver various data in series, such as by scrolling through data, or presenting sets of data for a period of a period of time (such as few seconds or a minute or two, or even longer), and then a second "page" of data is presented (for the same or for a different period of time), and then a third "page" and a fourth or more. The number of pages is generally limited by the time it takes to display data in a useful way, by the storage/memory in the device 20, and by the user's willingness to configure pages.

The data presented may repeat in different pages, or each page may have its own unique set of data, or there may be a combination of unique pages and repetitive pages or data presentations. Other displays may be configured to provide the same or different data and the same or different pages. For example, the device 20 may be configured to display the vehicle elevation (from the vehicle GPS) on the head-up display for five seconds every minute.

The device 20 may also be configured to always display a single "page" of data on a specific display until the user or vehicle operator notifies the device 20 to change the display to a different page of data. In one embodiment of the system, the device 20 may be monitoring the door lock button 52 through the OBD-II port 12. If the doors have already been locked and the vehicle operator presses the door lock button 52 a second time, the device 20 may be configured to take this event to mean that the vehicle operator desires to change display "pages" to the next "page" in the series for that vehicle display. In another embodiment of the system, the device 20 may be monitoring the cruise control buttons 56. When the device 20 detects that a cruise control button 56 has been pressed while the cruise control is not active, the device 20 may initiate a user configured action, such as changing display pages, upon recognizing that event.

The device 20 permits a user or vehicle operator to configure a plurality of "pages" for each vehicle display. These pages may contain customized text, vehicle data, or other information as configured by the user. According to one embodiment, the device 20 assigns each unique vehicle data or information value a distinct number. This distinct number can then be used as a reference for that unique vehicle data item or information value. For example, the device 20 may assign the number 1 to mean Engine RPM and the number 2 to mean Vehicle Speed. The device 20 also allows the user to insert special identifier characters around a distinct number when configuring customized "pages" to indicate that an actual vehicle data or information value is to be shown in that position rather than plain text.

For example, in one embodiment, the device 20 utilizes curly braces (that is '{' and '}') as the special identifier characters. The user may configure the heads-up display with the text "Engine RPM: {1} Vehicle Speed: {2}". The device 20, when showing the customized text on the vehicle display, will substitute the identifiers indicated by the curly braces with the actual vehicle data or information values assigned to the respective numbers. Thus, if the vehicle were traveling at 35 miles per hour and the engine rpm is 2536, the device would show on the heads-up display the text "Engine RPM: 2536 Vehicle Speed: 35".

Figure 5:
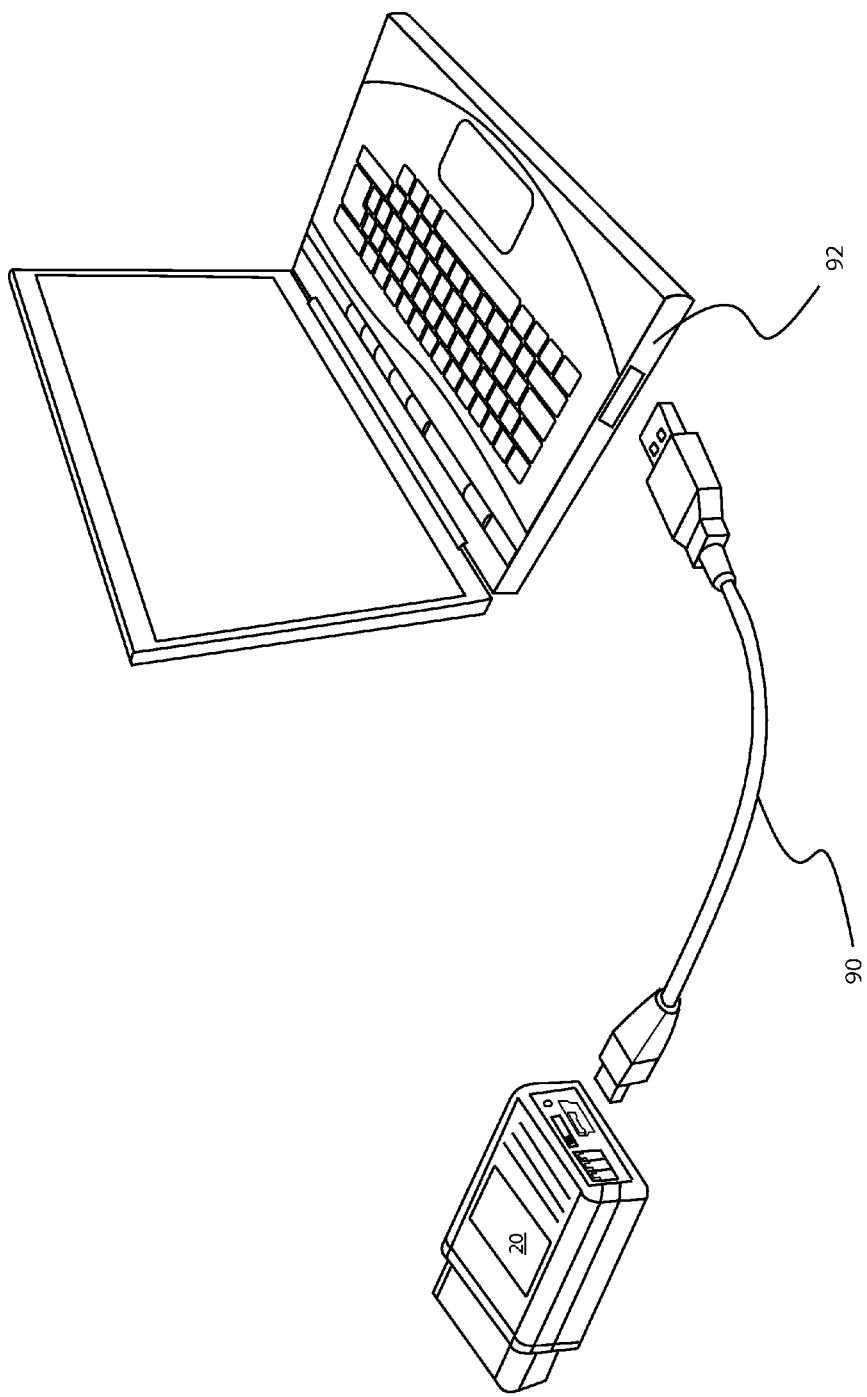
FIG. 5 depicts a perspective view of one method of connecting the device to a laptop computer.

According to one embodiment, the device 20 is disconnected from the OBD-II port 12 and connected to a computer, laptop, smartphone, or tablet by way of the USB port 72 on the device 20. According to other embodiments, the device 20 has wireless capability, or has a long communications cable 16, and thus need not be disconnected from the OBD-II port 12. As depicted in FIG. 5, after connecting the device 20 to a computer, laptop, smartphone, or tablet using the USB port 72 or other communications method, the user may configure customized display pages and other settings. The device is then plugged back into the OBD-II port 12, where it operates using the updated configuration.

A user may configure the device 20 to provide various vehicle data or other information. This includes such data as vehicle operating parameters, communications settings and commands. The values represented by this text, data, or other information may be acquired through the vehicle diagnostic port or a peripheral input port. The parameters and values are monitored and shown on one of the built-in vehicle displays, which is updated at default intervals or at user-set intervals.

The device 20 may switch to display one, two, three or more separate pages on one or more of the built-in vehicle displays.

The system/device may be configured so that it monitors whether one or more vehicle operating parameters, peripheral input data, calculations, or other information exceed one or more designated limits and, when a configured vehicle operating parameter, peripheral input data, calculations, or other information exceeds a configured limit, the device causes the vehicle systems to alert the vehicle operator or other user. The device 20 allows the user to configure the limits by way of a simple mathematical expression, which expression may include one or more conditions and special text symbols and operators to identify specific pieces of vehicle data or other information and how it is to be parsed, as is known in the art.

In one embodiment, the expression may include vehicle data identifiers preceded by the word "pid" with a distinct number in parenthesis following the word "pid" as well as conditional operators that specify how to evaluate different vehicle data or other information. For example, the expression may include a condition to check whether the data is over a specific value (>), under a specific value (<), over or equal to a specific value (>=), under or equal to a specific value (<=), equal to a specific value (==) or not equal to a specific value (!=). When more than one condition is supplied, the conditions may be separated by Boolean operators such as AND, OR, and NOT (often identified by the text symbols &&, ||, and !) to specify the relationship of one condition to the next.

For example, the user may configure the device 20 with the expression "(pid(1)>=5500) && (pid(2)>70)". In this example, the "pid" number 1 could mean Engine RPM and the "pid" number 2 could mean Vehicle Speed. As configured, this example expression would evaluate the condition as meaning if Engine RPM is greater than or equal to 5500 AND if Vehicle Speed is greater than 70. The device 20 may then take a user configured action upon detecting that the configured limit specified by this example expression has been exceeded, such as alerting the vehicle operator or other user by way of sounding a configurable audible chime or by illuminating one or more of the built-in vehicle warning lights, or by way of displaying configurable text, data, or other information on a built-in vehicle display, or by a combination of more than one of these devices.

The user may configure the device 20 to perform custom calculations, formulas, or algorithms to generate new data based on existing vehicle or peripheral input data. This new data can be shown on built-in vehicle displays or used as a configured limit to alert the vehicle operator or other user. The user configures these custom calculations using a similar mathematical expression as described earlier. For example, suppose the "pid" number 2 was assigned to mean Vehicle Speed (in kilometers per hour) and the user configured a custom calculation such as "pid(2)*0.621371" to multiply the "pid" value identified by the number 2 by the number 0.621371 to thereby convert from kilometers per hour to miles per hour. The user could then configure this example custom calculation to have a specific assigned numeric identifier of its own, which could then be used in other configured custom calculations, limits, or customized display pages.

In some embodiments, the device 20 can be removed from the vehicle and connected to an external computer (such as a desktop, laptop, tablet, smartphone, or other computing apparatus) for configuration purposes. As depicted in FIG. 5, one way to configure the device 20 involves connecting the device 20 to a laptop computer 92 by way of a USB cable 90. Using these connection methods, a user may enter configuration information into, for example, an application running on the laptop 92, and the device 20 is then updated with the new configuration by passing the instructions over the USB cable 90.

In other embodiments, the device 20 can remain connected to the vehicle and concurrently connected to such a computer for configuration purposes. Typically, but not necessarily, the device 20 stops monitoring, communicating, or commanding the vehicle while connected to such a computer. In other embodiments, the device 20 is configured with either a wired or wireless connection, thereby allowing that computer to communicate with the device 20 or the vehicle in a bidirectional manner.

The device 20 may include peripheral input ports for obtaining data from external sources and acting upon that data in a predetermined way. For example, the user may connect a 0 to 5 volt wideband oxygen sensor to the peripheral input port 78 using the terminal block 80. The user may then configure the device 20 to utilize the peripheral input data from this wideband oxygen sensor in a custom calculation to output the data scaled as an air/fuel ratio or lambda value which can be shown on vehicle display "pages" or used as a configured limit.

The device 20 may contain a built-in display, display connector, or indicator lights to provide information to the vehicle operator or other user about vehicle operating conditions. The device 20 may contain a built-in speaker or audio output connector to provide audible alerts to the vehicle operator or other user about vehicle operating conditions. The device 20 may contain a means for data storage and may be configured to data log vehicle operating parameters or other vehicle information, events, and conditions.

The device 20 may switch between one or more pages being displayed on one or more of the built-in vehicle displays upon receiving an event initiated by the vehicle operator or other user. The event initiated by the vehicle operator or other user may be, for example, the action of pressing, actuating, moving, or turning a built-in vehicle button, switch, knob, or sensor or by gesturing with respect to a vehicle sensor (such as by gesturing or waving towards or in front of or in some other fashion with respect to the sensor). Alternatively, the event initiated by the vehicle operator or other user may be the action of pressing, actuating, moving, turning, or gesturing a button, switch, knob, or sensor on the device 20 or connected to the device 20 via a peripheral input port.

In one embodiment, the device 20 may allow the user to set up a plurality of separate distinct configurations, any of which may be selected for use by way of the configurable switch 76. For example, the user may configure one configuration to have "pages" of fuel economy and trip information and configured limits for alerts and custom calculations relating to fuel economy and trip information. The user may then configure a separate configuration to have "pages" of engine performance data and associated configured limits for alerts and related custom calculations. The user or vehicle operator may then simply switch between these separate configurations by way of the configurable switch 76 so that when the user or vehicle operator is driving across the country the fuel economy and trip information configuration is active, and when doing road racing, autocrossing, or some other performance event, the engine performance data configuration is active.

The present system allows a user to configure the various displays and other input and output elements of a vehicle in a wide variety of way. The device 20 can easily be unplugged and removed without having made any permanent alterations to the vehicle. Thus, the present invention has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A system for providing information and alerts to operators of motor vehicles comprising:
   a device adapted to be removably attached to a motor vehicle diagnostic data port;
   the device being configurable by a vehicle operator or other user;
   the device being capable of communicating through the diagnostic data port with at least one built-in or factory-installed vehicle electronic control module, audible warning chime, visual warning light, gauge, or other display;
   the device incorporating a predetermined set of one or more of (I) vehicle operating parameters, (ii) communications settings, and (iii) commands;
   the device including, for each of one or more built-in or factory-installed vehicle gauges or other displays, a plurality of separate pages of vehicle operator or other user-configured text, data, or other information, each plurality of separate pages being designated for a specific built-in or factory-installed vehicle gauge or other display, and each page including one or more values acquired through the vehicle diagnostic port or a peripheral input port;
   monitoring the vehicle operating parameters;
   displaying one or more pages on one or more of the built-in or factory-installed vehicle gauges or other displays; and
   the device including the ability to switch between a plurality of separate pages being displayed on one or more of the built-in or factory-installed vehicle gauges or other displays.

2. The system of claim 1 wherein the device may be configured to monitor for one or more vehicle operating parameters exceeding one or more configured limits and, when a configured vehicle operating parameter exceeds a configured limit, alerting the vehicle operator or other user.

3. The system of claim 2 where the configured limit includes one or more conditions that may be over a specific value (>), under a specific value (<), over or equal to a specific value (>=), under or equal to a specific value (<=), equal to a specific value (==) or not equal to a specific value (!=), and when more than one condition is supplied, the conditions are separated by at least one Boolean operator to indicate the relationship of one condition to another condition.

4. The system of claim 2 where the device alerts the vehicle operator or other user by way of sounding a built-in or factory-installed vehicle audible chime.

5. The system of claim 2 where the device alerts the vehicle operator or other user by way of illuminating a built-in or factory-installed vehicle warning light.

6. The system of claim 2 where the device alerts the vehicle operator or other user by way of displaying configurable text, data, or other information on a built-in or factory-installed vehicle gauge or other display.

7. The system of claim 1 wherein the vehicle operator or other user can configure custom calculations, formulas, or algorithms to generate new data based on existing vehicle or peripheral input data and where this new data can be shown on built-in or factory-installed vehicle gauges, warning lights, or other displays or used as a configured limit to alert the vehicle operator or other user.

8. The system of claim 1 wherein the device can be removed from the vehicle and connected to a computing device for configuration purposes.

9. The system of claim 1 wherein the device can remain connected to the vehicle and concurrently connected to a computing device for configuration purposes.

10. The system of claim 9 wherein the device stops monitoring, communicating, or commanding the vehicle while connected to a user computing device.

11. The system of claim 1 wherein the device can be connected to a computing device with either a wired or wireless connection, thereby allowing that computing device to communicate with the device or the vehicle in a bidirectional manner.

12. The system of claim 11 wherein the device stops monitoring, communicating, or commanding the vehicle while connected to a user computing device.

13. The system of claim 1 wherein the device has peripheral input ports for obtaining data from external sources and acting upon that data in a predetermined way.

14. The system of claim 1 wherein the device contains a built-in display, display connector, or indicator lights to provide information to the vehicle operator or other user about vehicle operating conditions.

15. The system of claim 2 wherein the device contains a built-in speaker or audio output connector to provide audible alerts to the vehicle operator or other user about vehicle operating conditions.

16. The system of claim 1 wherein the device contains a means for data storage and can be configured to data log vehicle operating parameters or other vehicle information, events, and conditions.

17. The system of claim 1 wherein the device switches between one or more pages being displayed on one or more of the built-in or factory-installed vehicle gauges, warning lights, or other displays upon receiving an event initiated by the vehicle operator or other user.

18. The system of claim 17 wherein the event initiated by the vehicle operator or other user is an action of pressing, actuating, moving, turning, or gesturing with respect to a built-in or factory-installed vehicle button, switch, knob, or sensor.

19. The system of claim 17 wherein the event initiated by the vehicle operator or other user is the action of pressing, actuating, moving, turning, or gesturing with respect to a button, switch, knob, or sensor on said device or connected to said device via a peripheral input port.

* * * * *